J. E. HEATH.
Harvester.

No. 13,545.

Patented Sept. 11, 1855.

UNITED STATES PATENT OFFICE.

JNO. E. HEATH, OF GENEVA, OHIO.

IMPROVEMENT IN HARVESTING-MACHINES.

Specification forming part of Letters Patent No. 13,545, dated September 11, 1855.

*To all whom it may concern:*

Be it known that I, JOHN E. HEATH, of Geneva, in the county of Ashtabula and State of Ohio, have invented certain new and useful Improvements in Harvesting-Machines; and I hereby declare that the following is a full, clear, and exact description thereof, reference being had to the accompanying drawings, making part of this specification, in which—

Figure 1:
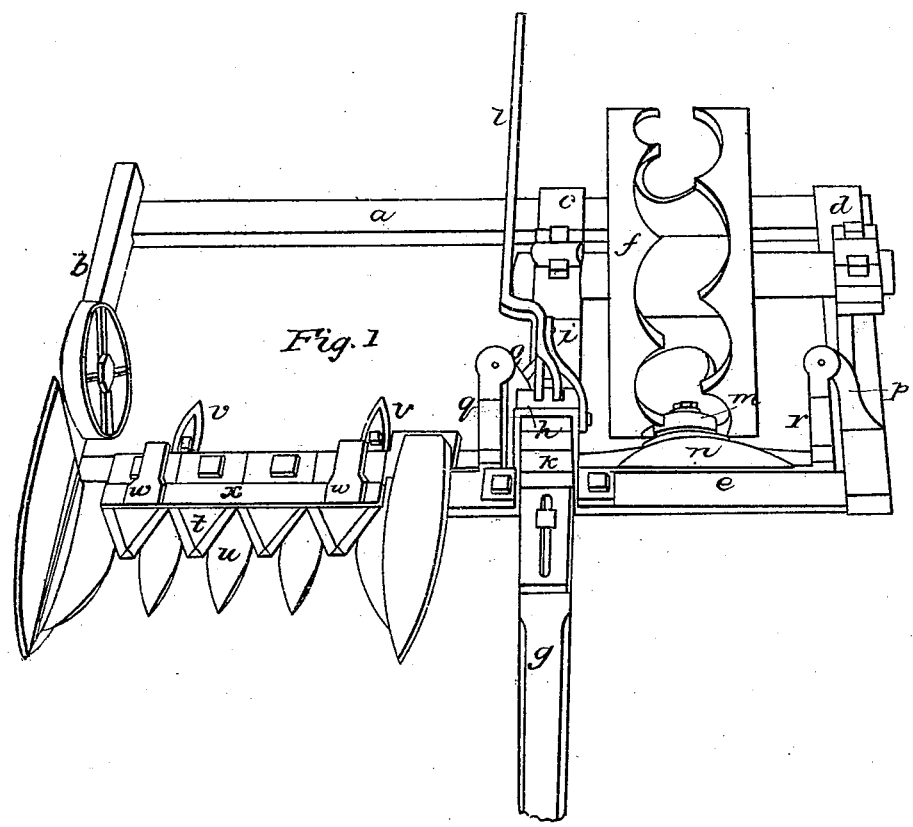
Figure 2:
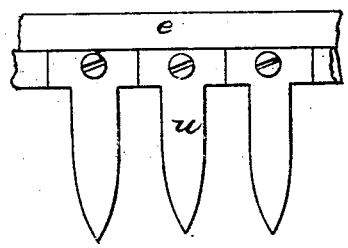
Figure 3:

Figure 1 represents a perspective view of the machine; Fig. 2, a portion of the front piece, $e$, showing the form and position of the fingers; and Fig. 3, a transverse section of Fig. 2.

The letters of reference indicate the same parts in the different figures wherever they occur.

I construct the machine as follows: A wooden back piece, $a$, a wooden side piece, $b$, and two iron cross-pieces, $c$ and $d$, securely fastened to an iron front-piece, $e$, extending the whole width of the machine, form the frame. From the cross-pieces $c$ and $d$ rise standards, upon which are placed the bearings of the shaft or axle of the driving-wheel $f$. To the standard, upon the cross-piece $c$, the end of the tongue $g$ is hinged. A lever of the first kind, $l$, having its fulcrum upon the top of an arm, $i$, projecting upward from the tongue $g$, with its forward end hinged to the top of a strong staple, $h$, rises from the front piece, $e$. The tongue $g$ passes through this staple, which is sufficiently high to allow the lever $l$ to elevate the front part of the machine over any obstacle or over the cut grass when turning. Upon the tongue $g$, in front of the staple $h$, is placed a gage-block, $k$, attached by a screw in a slot. This block serves to adjust the height of the cutters according to the height of the team or nature of the ground. A slit is formed in the periphery of the driving-wheel $f$ of such a form as to give a rapid reciprocating motion to the ball or friction-roller $m$ when the machine is in motion. This roller plays loosely upon an arm projecting upward and backward at an angle of about forty-five degrees from the horizontal cutter-bar $n$, which is suspended from the top of two standards, $o$ and $p$, by the hinged stirrups $q$ and $r$. By this arrangement I reduce the friction of the bar to a minimum and run it near the ground. The power being transmitted from the driving-wheel near its point of contact with the ground increases the stability of the machine and diminishes its draft. Upon the upper side of the cutter-bar $n$ are bolted the separate cutting-teeth $t$. These are placed close together, their cutting-edges, beveled on their uppers, meeting at an acute angle in front. The fingers $u$ are also made separate and in a T form, with points in front. The portions which are opposed to the cutting-edges of the teeth $t$ are beveled on the under side and ground sharp. The rear portions of the fingers are of the same thickness as the cutter-bar $n$, and, being firmly secured on the front half of the width of the front piece, $e$, form a rabbet in which the cutter-bar traverses. From the rear of the front piece, $e$, project horizontal pieces $v$, to which are secured by set-screws bent pieces $w$, which I call "jacks." These jacks are connected at their forward extremities by an adjustable pressure-bar, $x$, which bears upon the upper sides of the teeth $t$, its front corresponding with the point of junction of the cutting-edges of the teeth. This bar, with the jacks and set-screws, serves to regulate the pressure between the cutters and fingers as may be desirable.

Having thus fully described my improvements, what I claim as my invention, and desire to secure by Letters Patent, is—

1. Suspending the reciprocating cutter-bar $n$, by means of the stirrups $q$ and $r$, near the ground, in front of or behind the driving-wheel, in or near the same plane as the finger-board, in combination with the angular friction-roller $m$, the whole being arranged and operated in the manner and for the purpose set forth.

2. The adjustable pressure-bar $x$, constructed and arranged as herein described, in combination with the cutter-teeth $t$ and fingers $u$, for the purpose specified.

In testimony whereof I have hereunto signed my name this 20th day of December, 1854.

J. E. HEATH.

Witnesses:
SAML. GRUBB,
CHAS. EVERETT.